(12) United States Patent
Latimer et al.

(10) Patent No.: US 8,631,903 B2
(45) Date of Patent: Jan. 21, 2014

(54) PUMP JACK POLE BRACE LATCH AND METHOD

(75) Inventors: Brett A. Latimer, Mercer, PA (US); Robert D. Beggs, Mercer, PA (US)

(73) Assignee: Werner Co., Greenville, PA (US)

( * ) Notice: Subject to any disclaimer, the term of this patent is extended or adjusted under 35 U.S.C. 154(b) by 558 days.

(21) Appl. No.: 11/186,290

(22) Filed: Jul. 21, 2005

(65) Prior Publication Data

US 2007/0017742 A1  Jan. 25, 2007

(51) Int. Cl.
*E04G 7/10* (2006.01)

(52) U.S. Cl.
USPC .............................. 182/82; 182/229

(58) Field of Classification Search
USPC ........ 182/82, 229; 16/361, 364, 335; 292/290
See application file for complete search history.

(56) References Cited

U.S. PATENT DOCUMENTS

| | | | | |
|---|---|---|---|---|
| 375,459 A | * | 12/1887 | Pettigrew | 114/203 |
| 824,578 A | * | 6/1906 | Patten | 384/190.2 |
| 2,971,735 A | * | 2/1961 | Johnson | 248/533 |
| 3,760,452 A | * | 9/1973 | Edele | 15/250.352 |
| 4,048,050 A | * | 9/1977 | Hillman | 206/1.5 |
| 4,432,435 A | * | 2/1984 | Anderson | 182/82 |
| 4,446,945 A | * | 5/1984 | Anderson | 182/229 |
| 4,961,478 A | * | 10/1990 | Anderson | 182/229 |
| 5,142,974 A | * | 9/1992 | Fletcher | 100/137 |

\* cited by examiner

*Primary Examiner* — Alvin Chin Shue
(74) *Attorney, Agent, or Firm* — Ansel M. Schwartz

(57) ABSTRACT

A pump jack pole brace. The brace comprises a U-shaped yoke member having a first leg and a second leg. The brace includes a latch plate assembly having a first side slidably and pivotably attached to the first leg, and a second side having a tab which engages with the second leg to form a closed envelope with the yoke. A method for securing a pole for use of a pump jack system.

1 Claim, 5 Drawing Sheets

PUMP JACK POLE BRACE LATCH AND METHOD

FIELD OF THE INVENTION

The present invention is related to a pump jack pole brace. More specifically, the present invention is related to a pump jack pole brace having a latch plate assembly having a first side slidably and pivotably attached to a yoke member, and a second side having a tab which engages with the yoke to form a closed envelope with the yoke.

BACKGROUND OF THE INVENTION

A pump jack pole brace is used to support a pole vertically while the pump jack system is in use. The brace is used to secure the pole and to hold the pole at a specified distance from the work surface. The brace latch is used to grip the pole and keep the pole sturdy during use.

One design presently in production consists of a primarily U-shaped yoke member for accepting the pole, a plate pivotally attached to the yoke member for closing the opening in the yoke member, a latch member pivotally attached to the plate for keeping the plate in position and a threaded member for tightening the plate against the pole. This design is difficult to operate without having two hands free while attaching the brace to the pole and requires a number of unnecessary parts. The use of the unnecessary parts adds cost and labor to the manufacturing process.

SUMMARY OF THE INVENTION

The present invention pertains to a pump jack pole brace. The brace comprises a U-shaped yoke member having a first leg and a second leg. The brace comprises a latch plate assembly having a first side slidably and pivotably attached to the first leg, and a second side having a tab which engages with the second leg to form a closed envelope with the yoke.

The present invention pertains to a method for securing a pole for use of a pump jack system. The method comprises the steps of pivoting a latch plate assembly about a first leg of a yoke member from an open position about the pole to a partially closed position about the pole. There is the step of sliding the assembly forward to a second leg of the member relative to the first leg into a fully closed position about the pole wherein a tab of the assembly is inserted into a yoke slot of the member.

The present invention pertains to a method for securing a pole for use of a pump jack system. The method comprises the steps of placing a brace about the pole. There is the step of securing the brace to the pole using only one hand.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
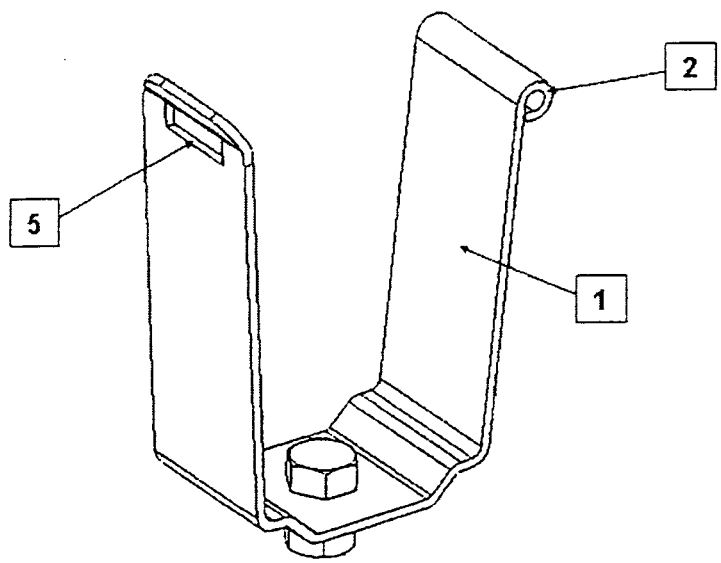
FIG. 4 is a schematic representation of a perspective view of the yoke.
Figure 5:
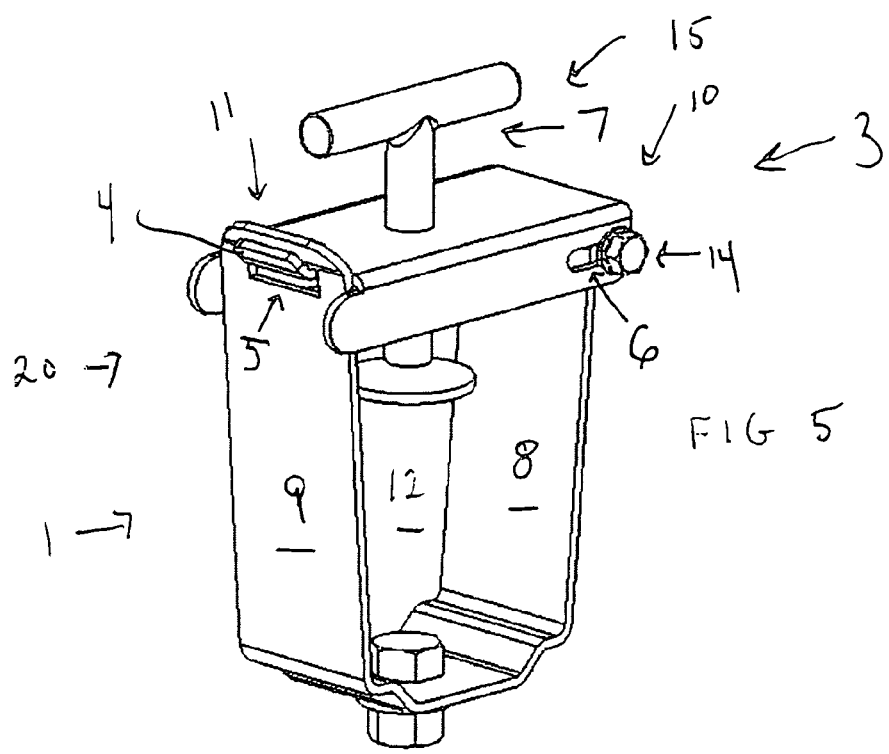
FIG. 5 is a schematic representation of a perspective view of the brace of the present invention with the latch assembly closed and with the tab engaged with the yoke.
Figure 6:
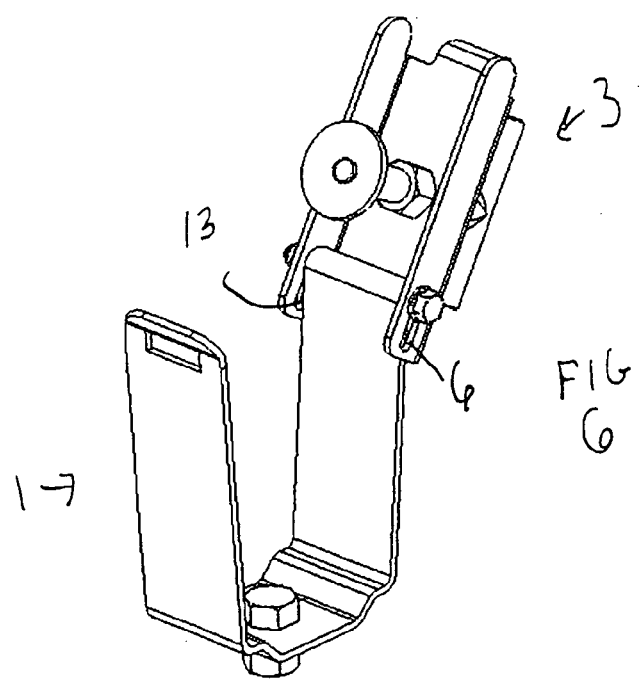
FIG. 6 is a schematic representation of a perspective view of the brace of the present invention with the latch assembly open.

Referring now to the drawings wherein like reference numerals refer to similar or identical parts throughout the several views, and more specifically to FIGS. 4 and 5 thereof, there is shown a pump jack 24 pole 22 brace 20. The brace 20 comprises a U-shaped yoke member 1 having a first leg 8 and a second leg 9. The brace 20 comprises a latch plate assembly 3 having a first side 10 slidably and pivotably attached to the first leg 8, and a second side 11 having a tab 4 which engages with the second leg 9 to form a closed envelope 12 with the yoke.

Preferably, the assembly includes a tensioner 15 for tightening the assembly against the poles 22. The first leg 8 preferably has an attachment portion for attaching the assembly to the yoke. Preferably, the brace 20 includes means for attaching the first side 10 to the attachment portion.

Figure 8:
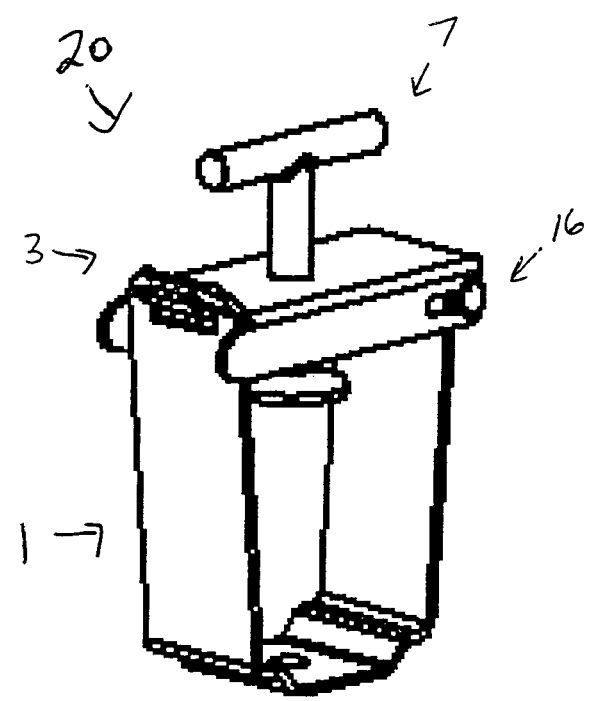
FIG. 8 is a perspective view of a brace with a rivet.

The tab 4 is preferably fixed in a permanent position to the second side 11. Preferably, the tensioner 15 includes a threaded handle 7. The attachment portion preferably includes a hinge barrel 2. Preferably, the second leg 9 includes a yoke slot 5 in which the tab 4 engages to form the closed envelope 12. The first side 10 preferably includes a horizontal slot 6 through which the attachment means extends to attach the member to the assembly. Preferably, the assembly includes a top through which the threaded assembly extends, a first side 10 connected to the top having the horizontal slot 6, and a second side 11 connected to the top having another horizontal slot 13 in alignment with the horizontal slot 6. The attachment means preferably includes a bolt 14. Alternately, the attachment means includes a rivet 16, as shown in FIG. 8.

The present invention pertains to a method for securing a pole 22 for use of a pump jack 24 system. The method comprises the steps of pivoting a latch plate assembly 3 about a first leg 8 of a yoke member 1 from an open position about the pole 22 to a partially closed position about the pole 22. There is the step of sliding the assembly forward to a second leg 9 of the member relative to the first leg 8 into a fully closed position about the pole 22 wherein a tab 4 of the assembly is inserted into a yoke slot 5 of the member. Preferably, there is the step of tightening a threaded handle 7 that extends through the assembly against the pole 22.

The present invention pertains to a method for securing a pole 22 for use of a pump jack 24 system. The method comprises the steps of placing a brace 20 about the pole 22. There is the step of securing the brace 20 to the pole 22 using only one hand.

In the operation of the invention, the latch mechanism is described that overcomes the faults described in the Background of the Invention. The latch mechanism provides the ability to easily attach the brace 20 to the pole 22 using only one hand and eliminates a number of parts to improve the cost and labor during the manufacturing process.

Figure 7:
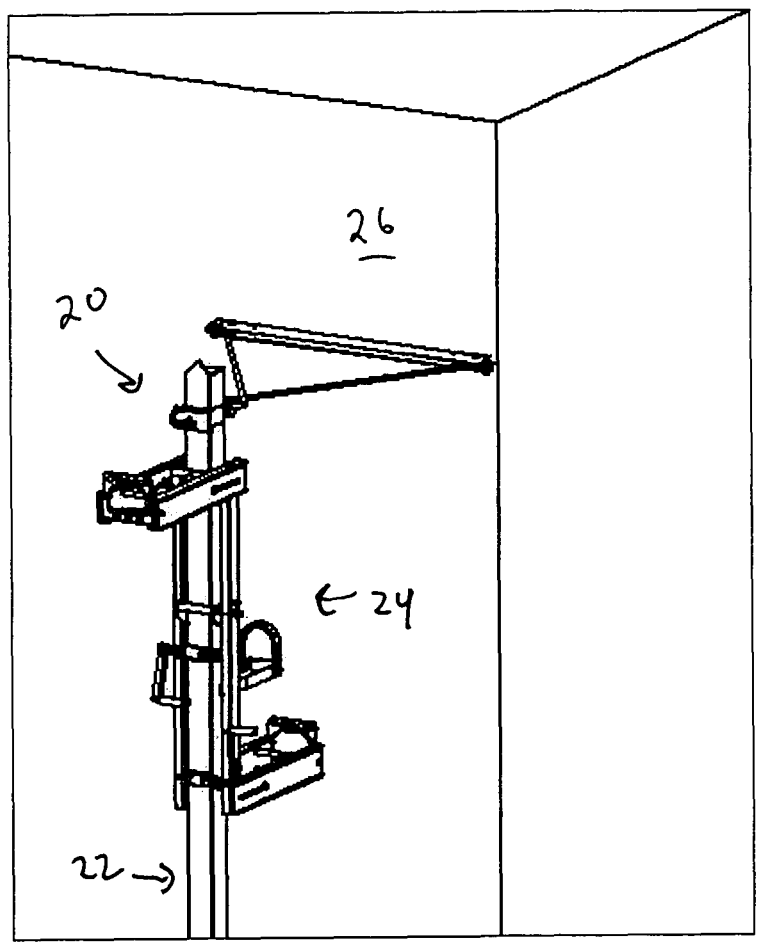
FIG. 7 is a schematic representation of a perspective view of the brace in conjunction with a pump jack and pole.

A latch has been designed for a brace 20 that is used for mounting poles 22 in both aluminum and steel pump jack 24 systems for support against a wall 26, as shown in FIG. 7. As shown in FIGS. 1-4, the latch design consists of a primarily U-shaped yoke member 1 with an integrally formed hinge barrel 2, a latch plate assembly 3 with an integrally formed latch tab 4 and a means to attach the assembly and the member together. The latch plate assembly 3 also contains a threaded handle 7 for tightening the latch plate assembly 3 against the pole 22. The yoke member 1 contains a yoke slot 5 on the end opposite the hinge barrel 2 and the latch plate assembly 3 contains horizontal slots 6 and 13 for sliding on the yoke member 1. The latch plate assembly 3 is pivotally attached to the yoke member 1.

Figure 1:
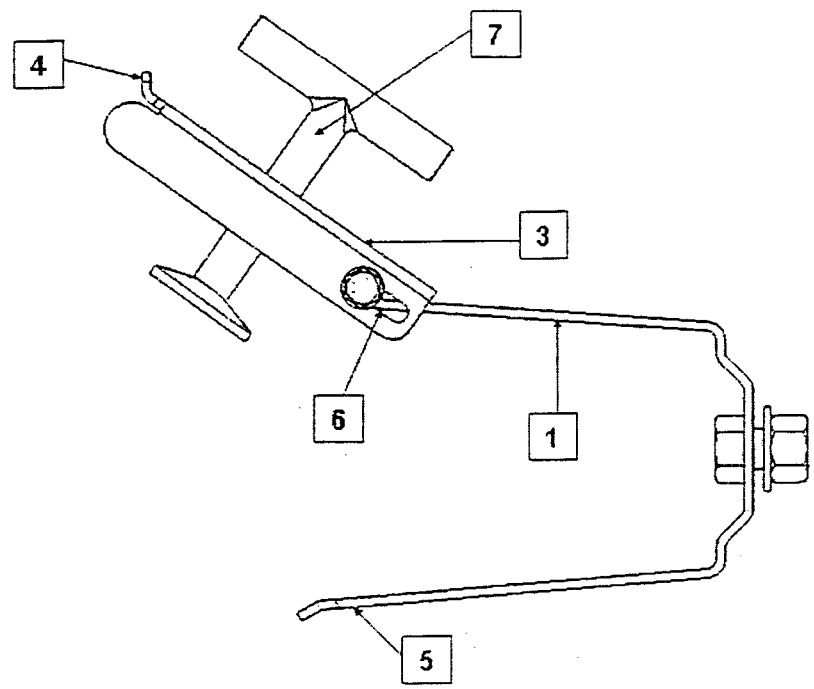
FIG. 1 is a schematic representation of a side view of a brace of the present invention with the latch assembly open.
Figure 2:
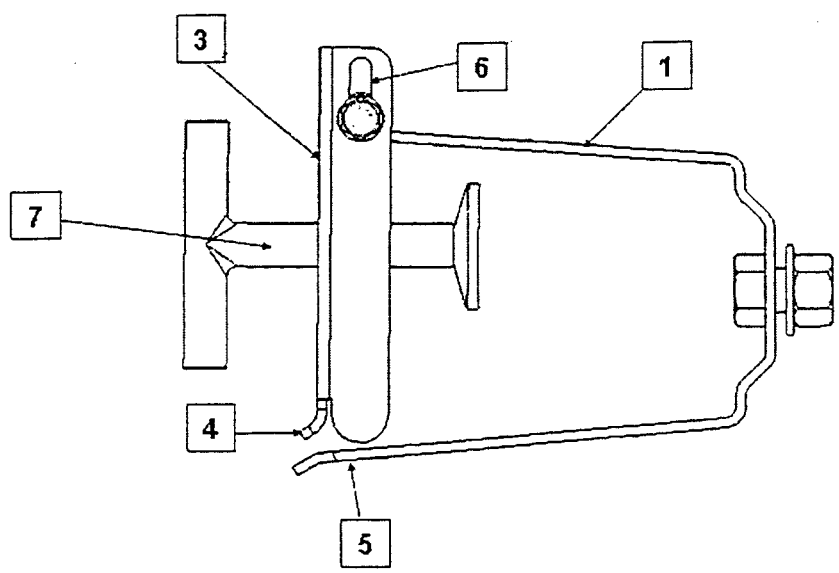
FIG. 2 is a schematic representation of a side view of the brace of the present invention with the latch assembly closed but with the tab not engaged with the yoke.
Figure 3:
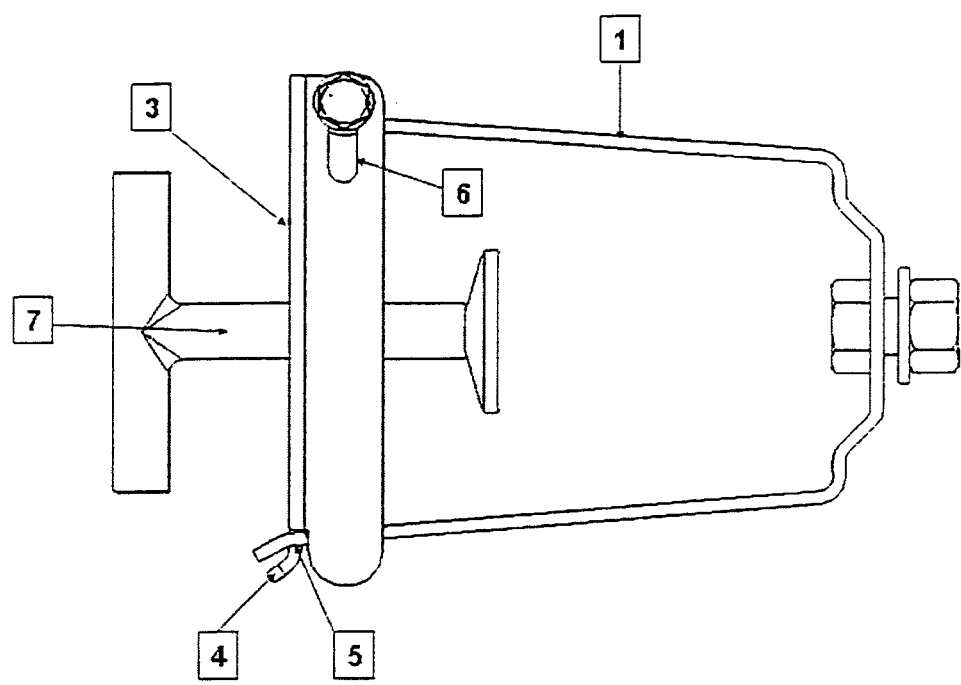
FIG. 3 is a schematic representation of a side view of the brace of the present invention with the latch assembly closed and with the tab engaged with the yoke.

FIG. 1 shows the latch plate assembly 3 in the open position to allow the brace 20 to be installed around the pole 22. FIG. 2 shows the latch plate assembly 3 in a partially closed position and FIG. 3 shows the latch plate assembly 3 in the fully closed position. The process of latching and unlatching the brace 20 shown in FIGS. 1-3 can be accomplished with one hand, which allows the other hand of the user to be available for maintaining balance while attaching the brace 20. The assembly of the brace 20 latch to the pole 22 involves pivoting the latch plate assembly 3 from the open position in FIG. 1 to the partially closed position shown in FIG. 2. The latch plate assembly 3 is then slid into the fully closed position shown in FIG. 3, wherein the latch tab 4 is inserted into the yoke slot 5 of the yoke member 1. The threaded handle 7 is then tightened against the pole 22 to lock the latch tab 4 in place and keep it from moving.

FIG. 4 shows the primarily U-shaped yoke component 1 with integrally formed hinge barrel 2. By integrally forming the hinge barrel 2 into the yoke 1, it is taught that an additional component and means to attach the additional component are not required. Additionally, the integrally formed hinge barrel 2 allows for optimal process control in manufacturing the brace 20 assembly and reduces potential quality issues.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A pump jack pole brace comprising:

an intergrally formed U-shaped yoke member having a first leg and a second leg that is positioned about the pole during use and a latch plate assembly having a first side slidably and pivotably attached to the first leg, and a second side having a tab which engages with the second leg to form a closed envelope with the yoke in which the pole is disposed to keep the pole sturdy during use, wherein the tab is fixed in a permanent position to the second side and the second leg includes a yoke slot in which the tab engages to form the closed envelope, the assembly includes a tensioner which includes a threaded handle for tightening the assembly against the poles, wherein the first leg has an attachment portion which includes a hinge barrel for attaching the assembly to the yoke, including attachment means for attaching the first side to the hinge barrel, wherein the attachment means includes one of a bolt and a rivet, wherein the assembly includes a top through which the threaded handle extends, a first side connected to the top and having the horizontal slot, and a second side connected to an opposite side of the top having another horizontal slot in alignment with the horizontal slot, wherein the attachment means extends through the horizontal slot and the another horizontal slot to attach the U-shaped yoke member to the latch plate assembly in a pivotable and slidable hinge connection.

* * * * *